United States Patent
Miyamoto (10) Patent No.: US 12,342,317 B2
(45) Date of Patent: Jun. 24, 2025

(54) MONITORING DEVICE, TRACKING METHOD, AND NON-TRANSITORY COMPUTER-READABLE MEDIUM

(71) Applicant: NEC Corporation, Tokyo (JP)

(72) Inventor: Shinichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 119 days.

(21) Appl. No.: 17/946,305

(22) Filed: Sep. 16, 2022

(65) Prior Publication Data

US 2023/0015362 A1 Jan. 19, 2023

Related U.S. Application Data

(63) Continuation of application No. 17/432,206, filed as application No. PCT/JP2019/007234 on Feb. 26, 2019, now Pat. No. 11,882,542.

(51) Int. Cl.
*H04W 64/00* (2009.01)
*G01S 13/58* (2006.01)
(Continued)

(52) U.S. Cl.
CPC ......... *H04W 64/006* (2013.01); *G01S 13/589* (2013.01); *H04W 4/029* (2018.02); *H04W 4/40* (2018.02)

(58) Field of Classification Search
CPC ..... H04W 64/006; H04W 4/029; H04W 4/40; G01S 13/589; G01S 13/58; G01S 13/937; G01S 13/72; B63B 49/00; H04N 7/18
See application file for complete search history.

(56) References Cited

U.S. PATENT DOCUMENTS 8,411,969 B1 4/2013 Joslin et al.
10,147,399 B1 * 12/2018 Mott .................. G06V 20/10
(Continued)

FOREIGN PATENT DOCUMENTS

JP H09-307883 A 11/1997
JP 2000-152220 A 5/2000
(Continued)

OTHER PUBLICATIONS

US Office Action for U.S. Appl. No. 17/432,206, mailed on May 3, 2023.
(Continued)

*Primary Examiner* — Ankur Jain
(74) *Attorney, Agent, or Firm* — Sughrue Mion, PLLC (57) ABSTRACT

The present disclosure is directed to providing a monitoring device that can improve the accuracy in tracking ships. A monitoring device (10) according to the present disclosure includes a position information acquiring unit (11) configured to acquire position information of an object to be tracked; an estimating unit (12) configured to estimate a position of the object to be tracked displayed in an image captured of a predetermined region; and an information generating unit (13) configured to generate path information of the object to be tracked by supplementing, based on an estimated position of the object to be tracked, the position of the object to be tracked held between the position indicated by the position information acquired at a first timing and the position indicated by the position information acquired at a second timing later than the first timing.

20 Claims, 8 Drawing Sheets

(51) Int. Cl.
*H04W 4/029* (2018.01)
*H04W 4/40* (2018.01)

(56) References Cited

U.S. PATENT DOCUMENTS

| | | | |
|---|---|---|---|
| 11,151,884 | B2 | 10/2021 | Solomon et al. |
| 11,354,683 | B1 | 6/2022 | Shin et al. |
| 2009/0067670 | A1* | 3/2009 | Johnson ............. G06T 7/73 348/222.1 |
| 2009/0315756 | A1* | 12/2009 | Imazu ............... B63B 49/00 342/41 |
| 2010/0153013 | A1* | 6/2010 | Kondo ............... B63B 49/00 701/301 |
| 2010/0295718 | A1* | 11/2010 | Mohamadi ........... G01S 7/026 342/21 |
| 2012/0274504 | A1* | 11/2012 | Kubota .............. G01S 7/22 345/592 |
| 2015/0241560 | A1* | 8/2015 | Lee ................ G01S 13/66 701/454 |
| 2016/0063731 | A1 | 3/2016 | Yamamoto et al. |
| 2016/0082736 | A1 | 3/2016 | Mai et al. |
| 2016/0320476 | A1* | 11/2016 | Johnson ............. G06T 7/20 |
| 2017/0253308 | A1* | 9/2017 | Morita ............... G01S 7/12 |
| 2017/0285178 | A1 | 10/2017 | Platzer et al. |
| 2017/0309190 | A1* | 10/2017 | Suzuki ............... B63B 49/00 |
| 2018/0259339 | A1 | 9/2018 | Johnson et al. |
| 2019/0025069 | A1* | 1/2019 | Okuda .............. G01C 21/3664 |
| 2019/0034735 | A1* | 1/2019 | Cuban ............... G06V 40/16 |
| 2019/0132709 | A1* | 5/2019 | Graefe .............. G05D 1/028 |
| 2019/0163884 | A1 | 5/2019 | Shinohe |
| 2020/0025912 | A1 | 1/2020 | Inaba et al. |
| 2020/0090367 | A1 | 3/2020 | Nishiyama |
| 2020/0184828 | A1 | 6/2020 | Mazor et al. |
| 2021/0043091 | A1* | 2/2021 | Solomon ............ G01S 5/0027 |
| 2021/0334534 | A1* | 10/2021 | Xiong ............... G06V 10/80 |

FOREIGN PATENT DOCUMENTS

| | | |
|---|---|---|
| JP | 2001-188504 A | 7/2001 |
| JP | 2014-192700 A | 10/2014 |
| JP | 2016-072964 A | 5/2016 |
| JP | 2016-126624 A | 7/2016 |
| JP | 2018-019359 A | 2/2018 |
| JP | 2018-073129 A | 5/2018 |
| JP | 2018-077807 A | 5/2018 |
| WO | 2018/216537 A1 | 11/2018 |

OTHER PUBLICATIONS

International Search Report for PCT Application No. PCT/JP2019/007234, mailed on May 21, 2019.

* cited by examiner

MONITORING DEVICE, TRACKING METHOD, AND NON-TRANSITORY COMPUTER-READABLE MEDIUM

CROSS-REFERENCE TO RELATED APPLICATIONS

The present application is a continuation application of U.S. patent application Ser. No. 17/432,206 filed on Aug. 19, 2021, which is a National Stage Entry of international application PCT/JP2019/007234 filed on Feb. 26, 2019, the disclosures of all of which are incorporated in their entirety by reference herein.

TECHNICAL FIELD

The present disclosure relates to monitoring devices, tracking methods, and programs.

BACKGROUND ART

Monitoring systems that monitor ships sailing over the ocean are used to navigate the ships safely over the ocean. Information on the positions of the ships identified by the monitoring systems is transmitted to each ship, and this can be expected to keep the ships from colliding with each other.

Patent Literature 1 indicates that the position of a ship is recognized by use of a radar. Moreover, in one typically employed method of recognizing the positions of ships, a ship is provided with an automatic identification system (AIS), and a monitoring device collects AIS information to recognize the position of the ship. This AIS information includes such information as the name of the ship, its destination, and its current position.

CITATION LIST

Patent Literature

Patent Literature 1: Japanese Unexamined Patent Application Publication No. 2001-186504

SUMMARY OF INVENTION

Technical Problem

The positions of ships are identified periodically by use of radars. In addition, AIS information is transmitted from the ships to a monitoring system periodically. Therefore, the positions of the ships are identified periodically by use of the AIS information as well. However, if the positions of the ships can be identified only periodically, this does not allow for recognizing the path along which a given ship has moved from a point where the position of the ship has been identified at a given timing to a point where the position of the ship has been identified at the next timing. This therefore poses a problem in that the monitoring system cannot track ships accurately when tracking the ships based on their position information collected by use of radars and AIS information.

The present disclosure is directed to providing a monitoring device, a tracking method, and a program that can improve the accuracy in tracking ships.

Solution to Problem

A monitoring device according to a first aspect of the present disclosure includes a position information acquiring unit configured to acquire position information of an object to be tracked; an estimating unit configured to estimate a position of the object to be tracked displayed in an image captured of a predetermined region; and an information generating unit configured to generate path information of the object to be tracked by supplementing, based on an estimated position of the object to be tracked, the position of the object to be tracked held between the position indicated by the position information acquired at a first timing and the position indicated by the position information acquired at a second timing later than the first timing.

A tracking method according to a second aspect of the present disclosure includes acquiring position information of an object to be tracked; estimating a position of the object to be tracked displayed in an image captured of a predetermined region; and generating path information of the object to be tracked by supplementing, based on an estimated position of the object to be tracked, the position of the object to be tracked held between the position indicated by the position information acquired at a first timing and the position indicated by the position information acquired at a second timing later than the first timing.

A program according to a third aspect of the present disclosure causes a computer to execute acquiring position information of an object to be tracked; estimating a position of the object to be tracked displayed in an image captured of a predetermined region; and generating path information of the object to be tracked by supplementing, based on an estimated position of the object to be tracked, the position of the object to be tracked held between the position indicated by the position information acquired at a first timing and the position indicated by the position information acquired at a second timing later than the first timing.

Advantageous Effects of Invention

The present disclosure can provide a monitoring device, a tracking method, and a program that can improve the accuracy in tracking ships.

DESCRIPTION OF EMBODIMENTS

First Example Embodiment

Figure 1:
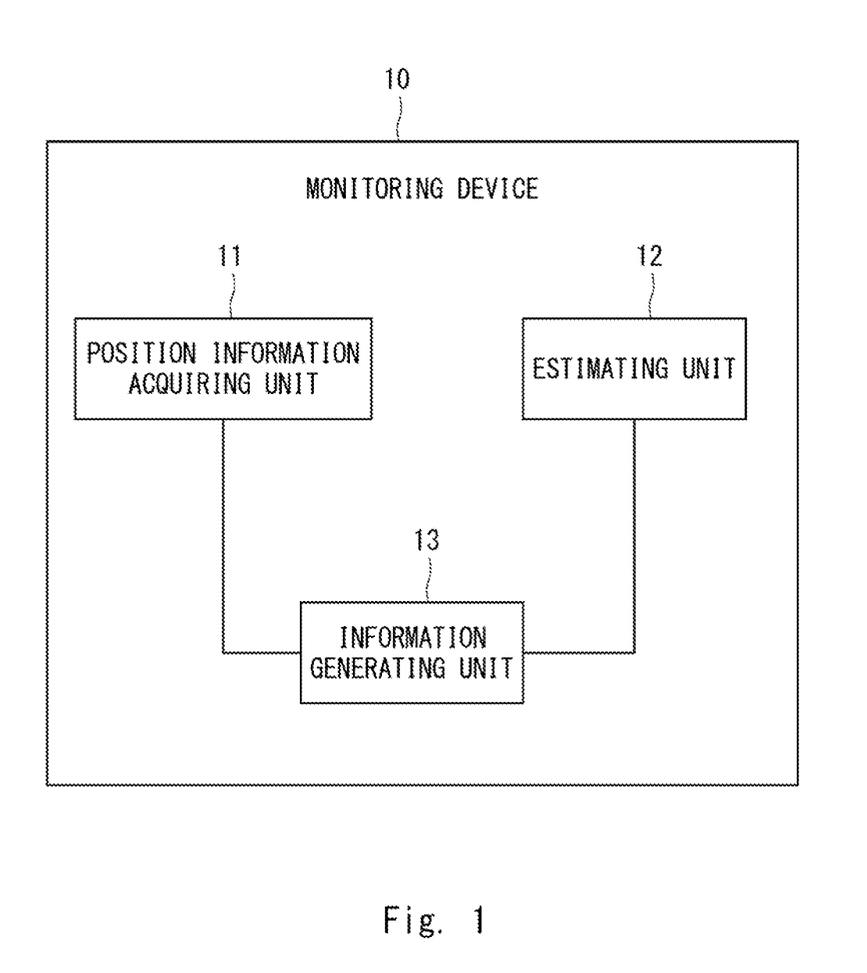
FIG. 1 is a configuration diagram of a monitoring device according to a first example embodiment.

Hereinafter, some example embodiments of the present disclosure will be described with reference to the drawings. With reference to FIG. 1, a configuration example of a monitoring device 10 according to a first example embodiment will be described. The monitoring device 10 may be a computer device that operates as a processor executes a program stored in a memory. The monitoring device 10 may be, for example, a server device.

The monitoring device 10 includes a position information acquiring unit 11, an estimating unit 12, and an information generating unit 13. The components of the monitoring device 10, such as the position information acquiring unit 11, the estimating unit 12, and the information generating unit 13, may each be software or a module that is processed as the processor executes a program stored in the memory. Alternatively, the components of the monitoring device 10 may each be hardware, such as a circuit or a chip.

The position information acquiring unit 11 acquires position information of an object to be tracked. The object to be tracked may be, for example, a means of transportation, such as a ship, a vehicle, or an aircraft; a person; or an animal. The position information may be, for example, information on the position of the object to be tracked measured by use of the global positioning system (GPS) or the like. For example, the position information acquiring unit 11 may receive AIS information including the position information from a ship provided with an AIS. Alternatively, the position information acquiring unit 11 may irradiate an object to be tracked with radio waves by use of a radar and measure the position of the object to be tracked. The position information acquiring unit 11 may acquire the position information of an object to be tracked regularly, periodically, or at any given timing.

Position information included in AIS information is information on the position acquired by the GPS or the like provided in a ship and includes information on the time at which the GPS or the like has acquired that information on the position.

The estimating unit 12 estimates the position of an object to be tracked displayed in an image captured of a predetermined region. The predetermined region is a region that the monitoring device 10 monitors and may be, for example, a partial region over an ocean or a partial region within a city. The estimating unit 12 captures an image of the predetermined region by use of a camera, for example. An image generated by use of a camera may be a still image or a moving image. To estimate the position of an object to be tracked displayed in an image may mean to convert the image coordinates or the camera coordinates of the object to be tracked displayed in the image to the world coordinates. The image coordinates or the camera coordinates may be indicated by the position of a pixel, for example. The world coordinates may be indicated by the latitude and the longitude, for example. The estimating unit 12 may hold table information representing the correspondence between the world coordinates and the image coordinates or the camera coordinates, for example.

The information generating unit 13 supplements, based on an estimated position of an object to be tracked, the position of the object to be tracked held between its position indicated by position information acquired at a first timing and its position indicated by position information acquired at a second timing that is later than the first timing. The information generating unit 13 generates path information of an object to be tracked by use of pieces of position information of the object to be tracked acquired at different timings and the position information of the object to be tracked estimated based on an image. The path information may be information indicated by a line segment or the like on a display or information indicating the positions of a given ship held at given times.

The second timing is a timing that comes a predetermined period past the first timing. The predetermined period may be, for example, several seconds or several minutes and may be determined, for example, by a system that acquires position information. The information generating unit 13 combines the position of an object to be tracked estimated based on an image captured between the first timing and the second timing with the positions of the object to be tracked held at the first timing and the second timing.

As described above, the monitoring device 10 estimates, based on an image captured of an object to be tracked, the position of the object to be tracked held at a timing when the position information of the object to be tracked cannot be acquired by use of an AIS or a radar, for example. The use of the monitoring device 10 can help reduce the period in which the position information of an object to be tracked cannot be identified, and thus the accuracy in tracking can be improved.

Second Example Embodiment

Figure 2:
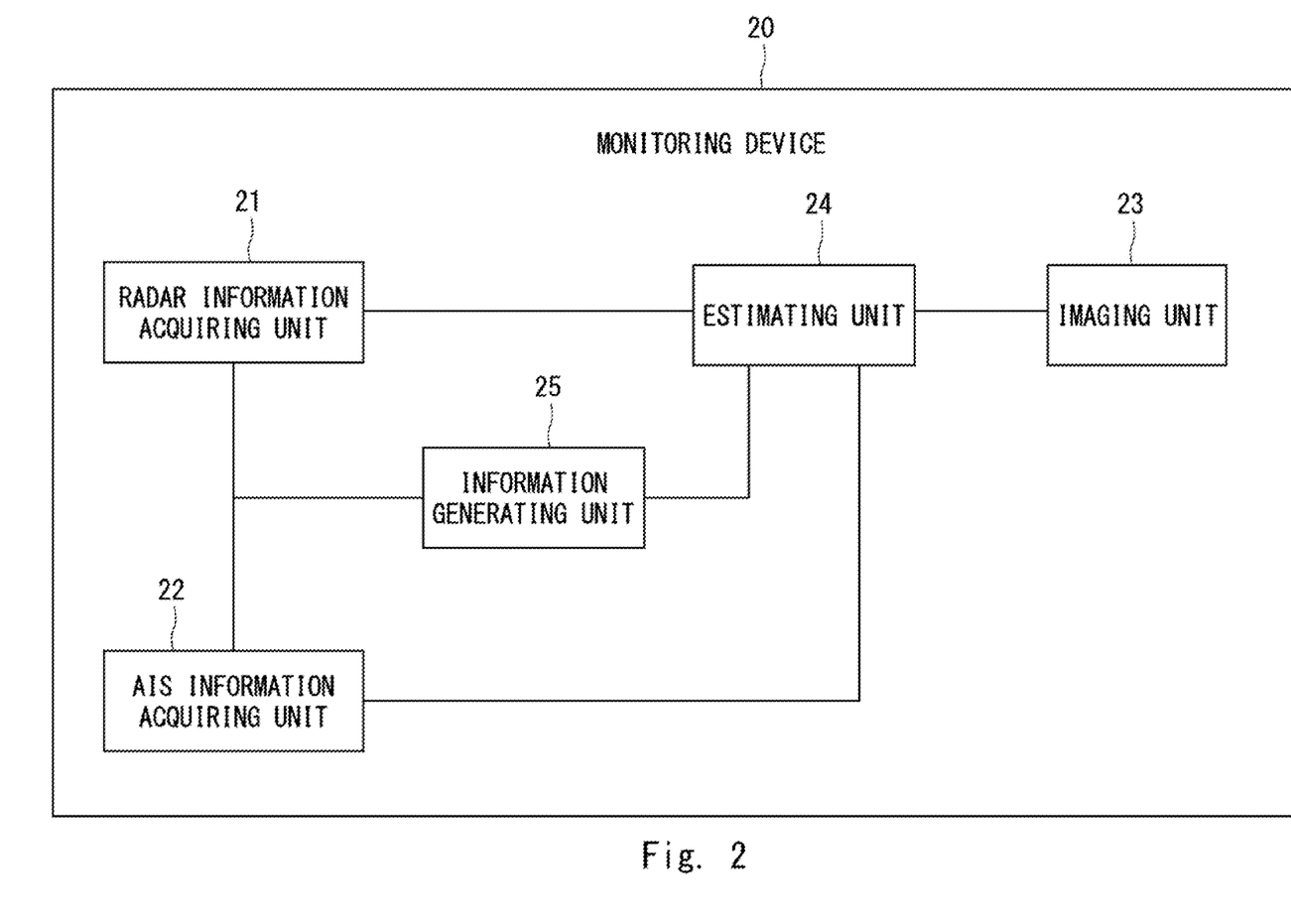
FIG. 2 is a configuration diagram of a monitoring device according to a second example embodiment.

Now, with reference to FIG. 2, a configuration example of a monitoring device 20 according to a second example embodiment will be described. The monitoring device 20 includes a radar information acquiring unit 21, an AIS information acquiring unit 22, an imaging unit 23, an estimating unit 24, and an information generating unit 25. The radar information acquiring unit 21 and the AIS information acquiring unit 22 correspond to the position information acquiring unit 11 illustrated in FIG. 1. The estimating unit 24 corresponds to the estimating unit 12 illustrated in FIG. 1. The information generating unit 25 corresponds to the information generating unit 13 illustrated in FIG. 1. Of the functions and operations of the monitoring device 20, the functions and operation similar to those of the monitoring device 10 illustrated in FIG. 1 will not be described in detail. According to the second example embodiment, the monitoring device 20 is used to monitor ships sailing over an ocean.

The radar information acquiring unit 21 irradiates a ship sailing in a monitored region periodically with radio waves by use of a radar and measures the position of the ship based on the reflected waves of the irradiating radio waves. Meanwhile, the AIS information acquiring unit 22 receives AIS information regularly from a ship provided with an AIS. The AIS information includes position information of the ship. The monitoring device 20 identifies the position of a ship provided with an AIS based on the position information included in its AIS information. Moreover, the monitoring device 20 identifies the position of a ship that is not provided with an AIS based on information obtained by use of a radar (hereinafter, referred to as radar information). The monitoring device 20 may also identify the position of a ship provided with an AIS based on its radar information.

The imaging unit 23 may be a camera that captures an image of a monitored region over an ocean. The imaging unit 23 may capture an image of a monitored region over an ocean by use of a plurality of cameras or by use of a single camera. The imaging unit 23 outputs image data obtained by capturing an image to the estimating unit 24.

The estimating unit 24 estimates the position of a ship included in image data. Specifically, the estimating unit 24 converts the image coordinates or the camera coordinates of a ship to the world coordinates. Moreover, the estimating unit 24 estimates or identifies whether ships included in images captured at different timings are the same ship. Images captured at different timings may be different frame images, for example.

The estimating unit 24 may track a ship by use of a particle filter, for example. In one possible case, a ship being tracked may become overlaid with another ship or an obstruction and cease to be included in a frame image. In such a case, the estimating unit 24 may estimate the position of the ship being tracked within the frame image by use of a particle filter. The estimating unit 24 outputs, to the information generating unit 25, the world coordinates of a ship included in image data, that is, information on the latitude and the longitude of the ship. Furthermore, the estimating unit 24 may output, to the information generating unit 25, information on the latitude and the longitude of a ship estimated by use of a particle filter.

The information generating unit 25 receives the position information of a ship provided with an AIS from the AIS information acquiring unit 22. The information generating unit 25 generates path information of a ship by combining position information received from the AIS information acquiring unit 22 and position information received from the estimating unit 24. Path information may be information that represents the path of a single ship by connecting two points indicated by respective pieces of position information with the same line on a GUI. Alternatively, path information may be information stored with two pieces of position information associated with each other by the same ship ID. The information generating unit 25 needs to combine position information of a given ship received from the AIS information acquiring unit 22 with position information of the same ship received from the estimating unit 24. For example, the information generating unit 25 may compare position information received from the AIS information acquiring unit 22 against position information estimated based on image data captured at the same timing as the timing when the position information received from the AIS information acquiring unit 22 has been measured. If these pieces of position information match with each other or if the difference between these pieces of position information is within a predetermined range, the information generating unit 25 may identify or estimate that these pieces of position information belong to the same ship. That the difference between these pieces of position information is within a predetermined range means that these pieces of position information differ only to an extent that can be regarded as an error.

Alternatively, the estimating unit 24 or the information generating unit 25 may analyze image data representing an image captured by the imaging unit 23 and identify the name of a ship included in the image data. If the estimating unit 24 or the information generating unit 25 cannot identify a part of the name of a ship included in image data, the estimating unit 24 or the information generating unit 25 may extract a ship that includes letters identified by referring to a database or the like that manages the names of ships, for example, and may identify the name of the ship. The database may manage the names of ships that may sail through the monitored region. If the name of a ship identified by use of image data matches the name of a ship included in AIS information, the information generating unit 25 may combine the position information of the ship included in the AIS information with the position information estimated based on the image data. Specifically, the information generating unit 25 may identify the name and the type of a ship based on image data captured by use of a ship-name reader camera installed at an entrance of a harbor.

Furthermore, position information of a ship estimated based on an image captured by the ship-name reader camera, information on the time at which the image has been captured, and the identified name and type of the ship may be displayed in an image captured by a wide-range monitoring camera used to track ships.

The information generating unit 25 may use, as correction information, the difference between position information received from the AIS information acquiring unit 22 and position information estimated based on image data captured at the same timing as the timing when the position information received from the AIS information acquiring unit 22 has been measured. The information generating unit 25 may modify or correct position information received from the estimating unit 24 by use of the difference between the aforementioned pieces of position information. To rephrase, the information generating unit 25 may use the difference between the two pieces of position information as an offset value.

Figure 3A:
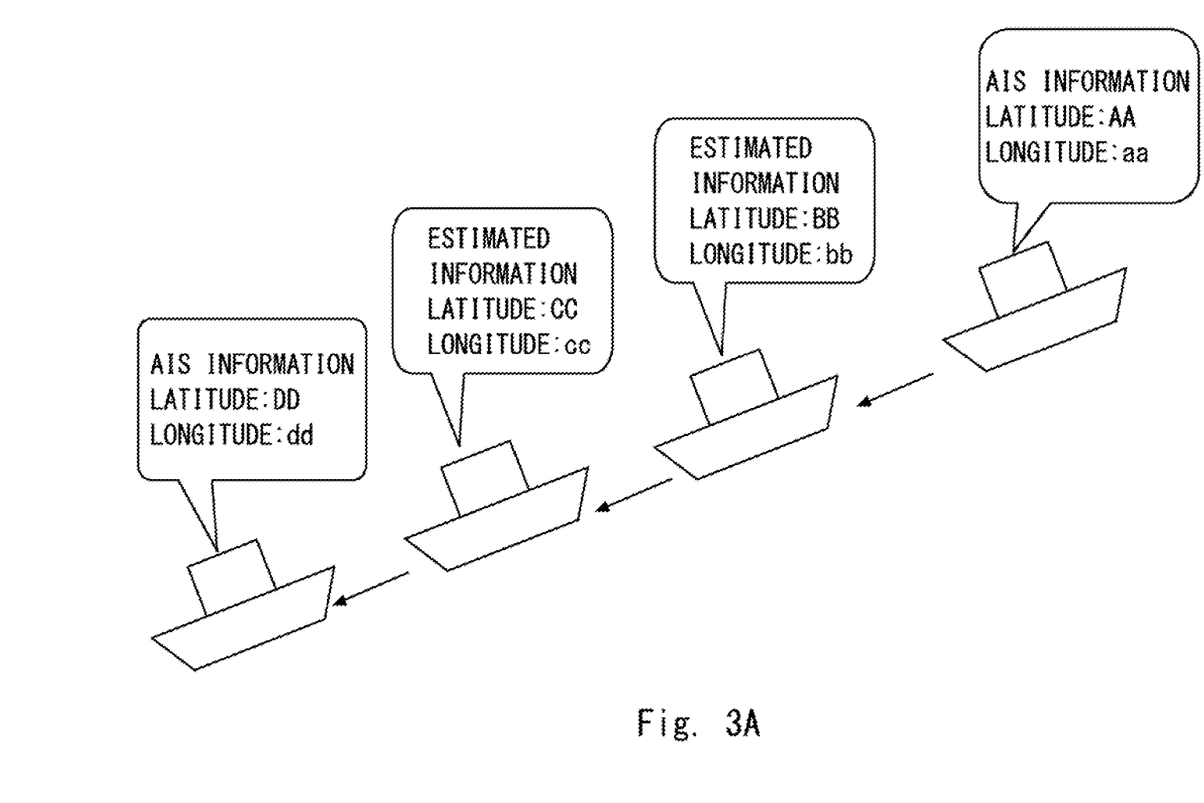
FIG. 3A illustrates a path of a ship according to the second example embodiment.

Now, with reference to FIG. 3A, path information to be generated by the information generating unit 25 will be described. FIG. 3A illustrates path information generated by the information generating unit 25. For example, the information generating unit 25 acquires, from the AIS information acquiring unit 22, the position information of a given ship that includes the latitude of AA and the longitude of aa as well as the position information of the same ship that includes the latitude of DD and the longitude of dd. In other words, this ship is moving from the point where the latitude is AA and the longitude is aa to the point where the latitude is DD and the longitude is dd.

The information generating unit 25 supplements position information received from the estimating unit 24 as the route or the path along which the ship has moved in a period from the timing when the latitude of AA and the longitude of aa have been measured to the timing when the latitude of DD and the longitude of dd have been measured. In other words, the information generating unit 25 supplements the position information that includes the latitude of BB and the longitude of bb and the position information that includes the latitude of CC and the longitude of cc as the position information of the ship held in a period from the timing when the latitude of AA and the longitude of aa have been measured to the timing when the latitude of DD and the longitude of dd have been measured. FIG. 3A illustrates a screen image to be output to a display unit, such as a display. For example, as illustrated in FIG. 3A, the latitude and the longitude of a ship may be displayed in a balloon next to the ship.

Figure 3B:
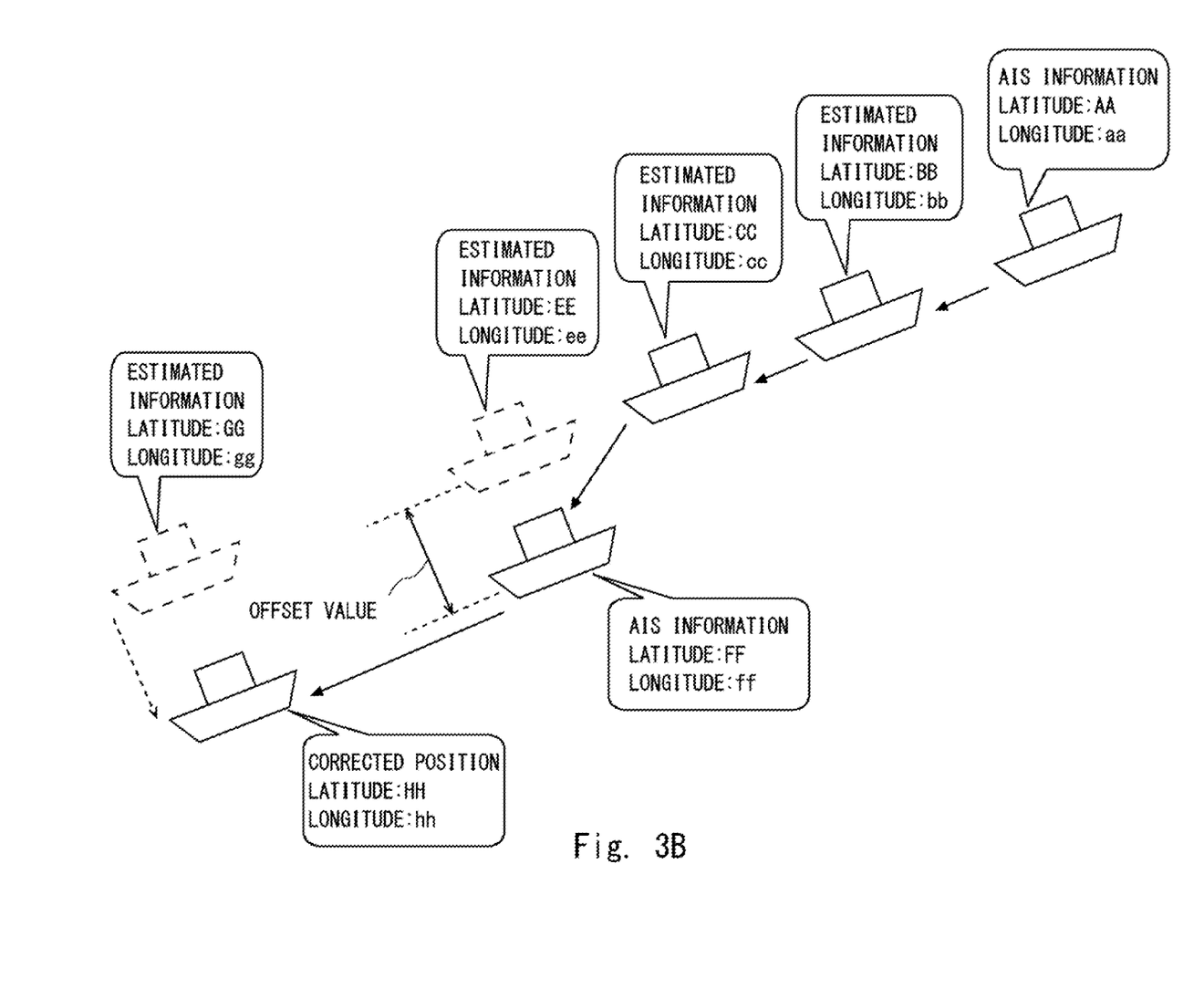
FIG. 3B illustrates a path of a ship according to the second example embodiment.

Meanwhile, FIG. 3B illustrates a case where position information estimated based on image data captured at the same timing as the timing when position information that includes the latitude of FF and the longitude of ff included in the AIS information has been measured indicates that the latitude is EE and the longitude is ee. The ships indicated by the dashed lines represent the positions of that ship estimated based on image data. In this case, the difference between the position where the latitude is FF and the longitude is ff and the position where the latitude is EE and the longitude is ee may be used as correction information or an offset value. The ships indicated by the dashed lines may not be displayed on the display unit, such as a display, and merely the ship located at the position where the latitude is FF and the longitude is ff may be displayed on the display unit. Thereafter, when the ship is estimated to be located at the position where the latitude is GG and the longitude is gg based on the image data, the estimated position where the latitude is GG and the longitude is gg may be corrected to the position where the latitude is HH and the longitude is hh by use of the offset value, as illustrated in FIG. 3B. The ship located at the position where the latitude is GG and the longitude is gg may not be displayed on the display unit, such as a display, and merely the ship located at the corrected position where the latitude is HH and the longitude is hh may be displayed on the display unit.

Now, with reference to FIG. 4, path information different from those illustrated in FIGS. 3A and 3B will be described. The pentagonal-shaped objects indicate ships mapped onto a map based on position information received from the AIS information acquiring unit 22. The dashed lines between two ships each indicate the path between two pieces of position information received from the AIS information acquiring unit 22. These dashed lines indicate the pieces of position information received from the estimating unit 24. In this manner, the information generating unit 25 may display position information received from the AIS information acquiring unit 22 by use of an object representing a ship and display position information received from the estimating unit 24 by use of a dashed line.

Figure 4:
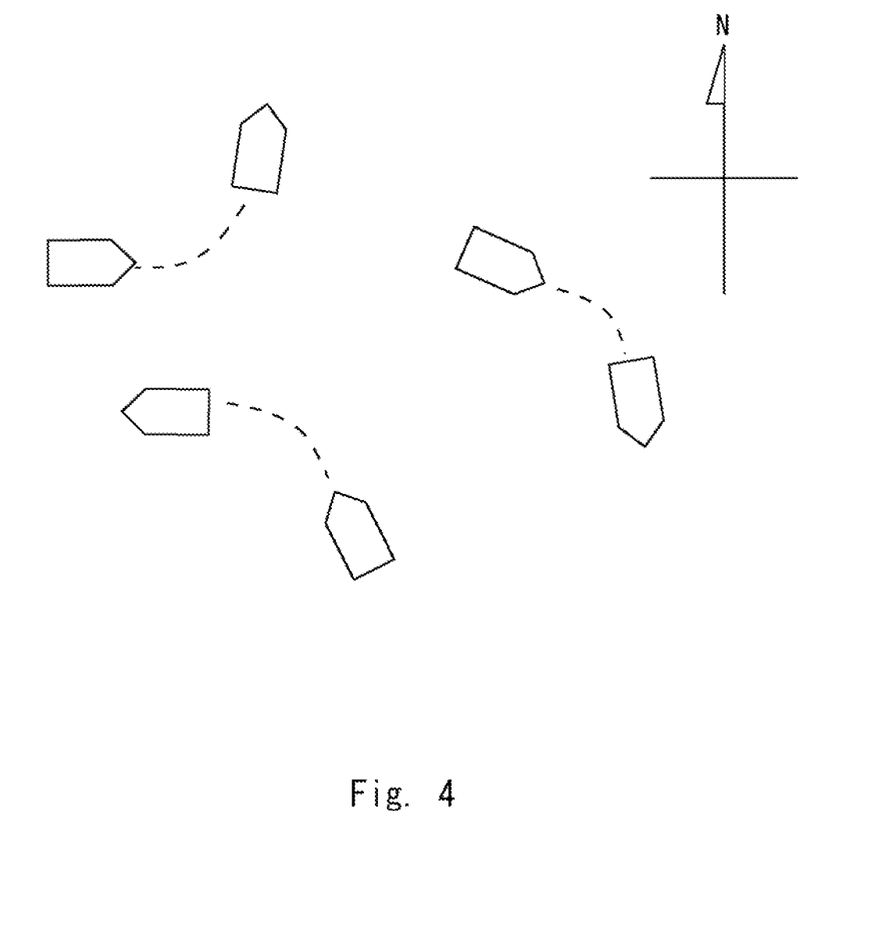
FIG. 4 illustrates paths of ships according to the second example embodiment.

The information generating unit 25 outputs the image data illustrated in FIG. 3A, 3B, or 4 to the display unit, such as a display. For example, FIGS. 3A and 3B each illustrate an image captured by the imaging unit 23 overlaid with position information identified by use of AIS information and position information estimated by the estimating unit 24. FIG. 4 illustrates a map image overlaid with position information identified by use of AIS information and position information estimated by the estimating unit 24. The image in FIG. 4 may be referred to as an AIS screen, for example.

FIGS. 3A, 3B, and 4 each illustrate an image that the information generating unit 25 generates by use of position information received from the AIS information acquiring unit 22. Alternatively, the information generating unit 25 may use position information received from the radar information acquiring unit 21. In other words, the information generating unit 25 may identify the position of a ship that is not provided with an AIS based on position information received from the radar information acquiring unit 21 and generate the image data illustrated in FIG. 3A, 3B, or 4. When representing position information identified based on radar information, the image in FIG. 4 may be referred to as a radar screen.

Figure 5:
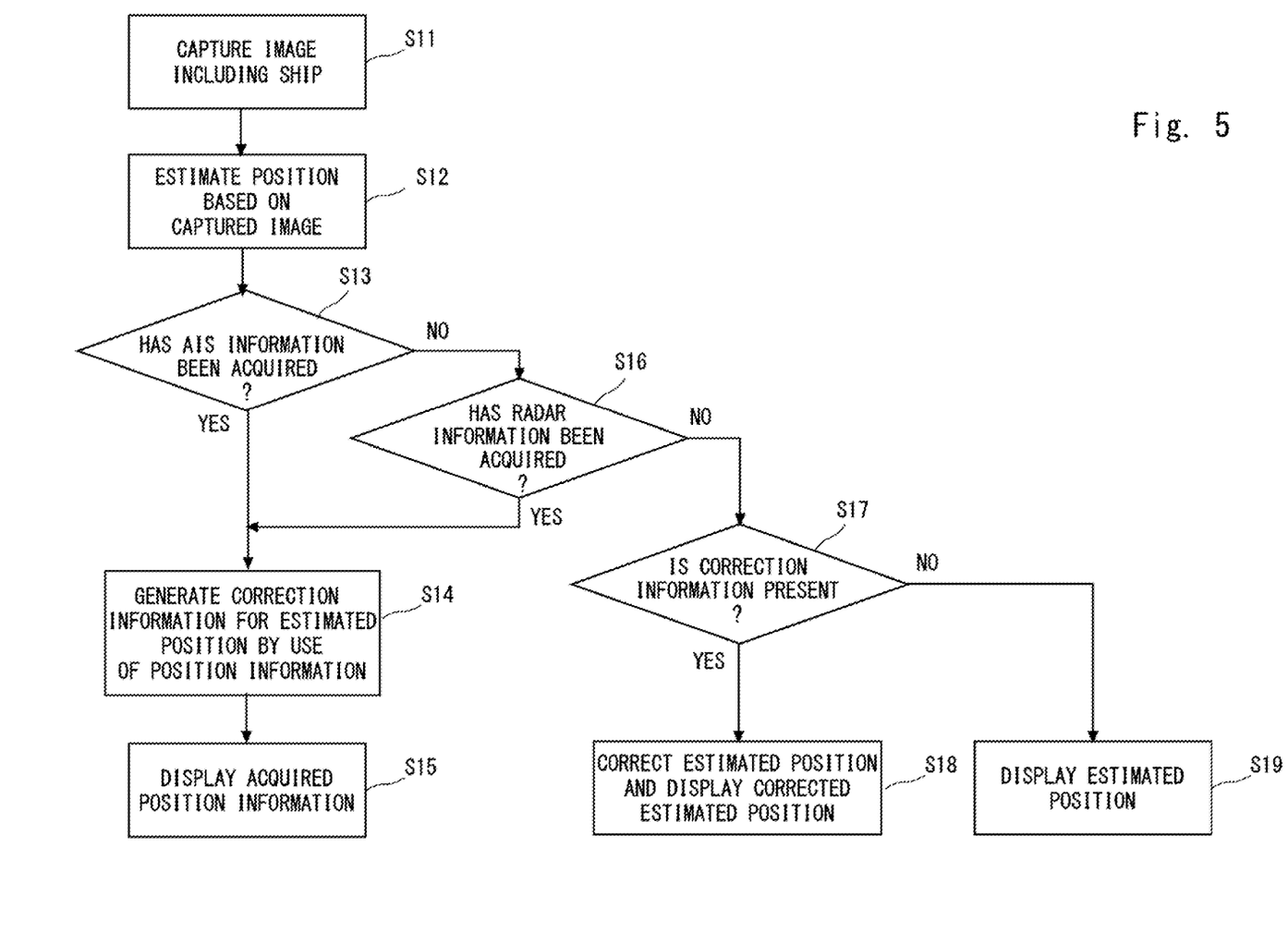
FIG. 5 illustrates a flow of a process of generating path information according to the second example embodiment.

Next, with reference to FIG. 5, a flow of a process of generating path information according to the second example embodiment will be described. First, the imaging unit 23 captures an image of a monitored region that includes a ship to be tracked (S11). Next, the estimating unit 24 estimates the position of the ship to be tracked included in the captured image (S12). For example, the estimating unit 24 may convert the image coordinates of the ship to the world coordinates based on a predetermined conversion table of the image coordinates and the world coordinates.

Next, the information generating unit 25 determines whether the information generating unit 25 has received AIS information related to the same ship as the ship whose position has been estimated at step S12 (S13). The AIS information includes the position information of the ship. The information generating unit 25 may regard the two ships as the same ship if the position information included in the AIS information matches the position estimated by the estimating unit 12 or if the difference between these two positions falls within a predetermined range. Alternatively, the information generating unit 25 may regard the two ships as the same ship if the name of the ship included in the AIS information is the same as the name of the ship displayed in image data. The name of the ship displayed in the image data may be identified through an image analyzing process or the like.

If the information generating unit 25 determines that the information generating unit 25 has acquired the AIS information related to the same ship as the ship whose position has been estimated at step S12, the information generating unit 25 generates correction information indicating the difference between the position information included in the AIS information and the position estimated at step S12 (hereinafter, referred to as an estimated position) (S14). The correction information may be rephrased as an offset value.

Meanwhile, if the information generating unit 25 determines at step S13 that the information generating unit 25 has not acquired the AIS information related to the same ship as the ship whose position has been estimated, the information generating unit 25 determines whether the information generating unit 25 has acquired radar information related to the same ship as the ship whose position has been estimated (S16). The radar information includes the position information of the ship. If the information generating unit 25 determines that the information generating unit 25 has acquired the radar information related to the same ship as the ship whose position has been estimated, the information generating unit 25 generates correction information indicating the difference between the position information included in the radar information and the estimated position (S14).

After step S14, the information generating unit 25 outputs the position information included in the AIS information to the display unit and causes the display unit to display the position information (S15).

If the information generating unit 25 determines at step S16 that the information generating unit 25 has not acquired the radar information related to the same ship as the ship whose position has been estimated, the information generating unit 25 determines whether the correction information indicating the difference between the estimated position and the position information included in the AIS information or the radar information is present (S17). Herein, the correction information is present if the information generating unit 25 has generated the correction information previously at a timing when the information generating unit 25 has acquired the position information included in the AIS information or the radar information.

If the information generating unit 25 determines that the correction information is present, the information generating unit 25 outputs an estimated position corrected by use of the correction information to the display unit and causes the display unit to display the corrected estimated position information (S18). To correct the estimated position by use of the correction information may mean to move the latitude and the longitude of the estimated position by adding or subtracting the correction information to or from the estimated position, for example. If the information generating unit 25 determines that the correction information is not present, the information generating unit 25 outputs the estimated position to the display unit and causes the display unit to display the estimated position (S19).

Figure 6:
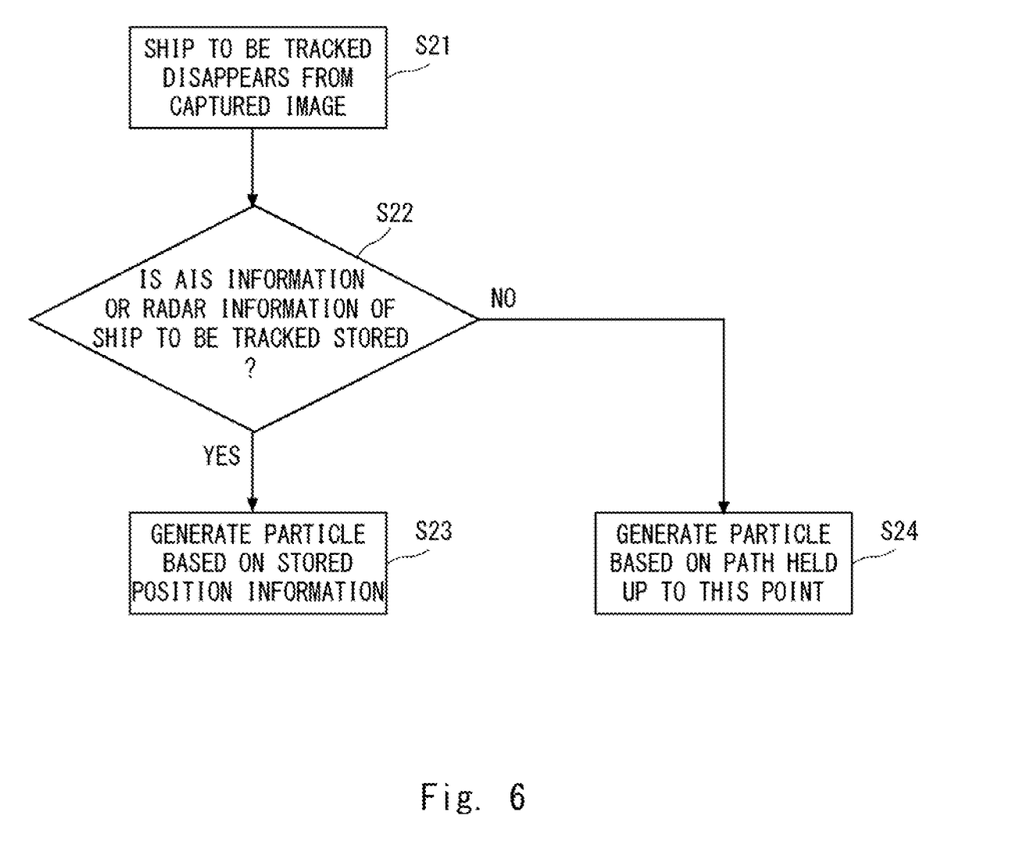
FIG. 6 illustrates a flow of a process performed when a ship to be tracked has disappeared from a captured image according to the second example embodiment.

Now, with reference to FIG. 6, a flow of a process performed when a ship to be tracked has disappeared from a captured image will be described. A ship to be tracked may disappear from a captured image, for example, when the ship to be tracked is overlaid with another ship and becomes hidden behind another ship or an obstruction. In other words, a ship to be tracked may disappear from a captured image when an occlusion occurs.

First, the estimating unit 24 recognizes that a ship to be tracked has disappeared from a captured image (S21). For example, the estimating unit 24 may recognize that the ship to be tracked has disappeared if the ship being tracked by use of a particle filter ceases to be displayed in the captured image.

Next, the information generating unit 25 determines whether the information generating unit 25 holds AIS information or radar information that includes information on the position of the ship to be tracked held at substantially the same timing as the timing when the image in which the ship to be tracked no longer appears has been captured (S22). Substantially the same timing falls within a predetermined period from the timing when the image in which the ship to be tracked no longer appears has been captured. In other words, substantially the same timing may deviate from the aforementioned timing by an amount that can be regarded as an error.

If the information generating unit 25 determines that the information generating unit 25 holds the AIS information or the radar information that includes the information on the position of the ship to be tracked held at substantially the same timing as the timing when the image in which the ship to be tracked no longer appears has been captured, the information generating unit 25 executes the process at step S23.

At step S23, the information generating unit 25 generates particles to be used to track the ship based on the position information included in the AIS information or the radar information (S23). To generate particles may be rephrased as to disperse particles.

Meanwhile, if the information generating unit 25 determines that the information generating unit 25 does not hold the AIS information or the radar information that includes the information on the position of the ship to be tracked held at substantially the same timing as the timing when the image in which the ship to be tracked no longer appears has been captured, the information generating unit 25 executes the process at step S24.

At step S24, the information generating unit 25 generates particles to be used to track the ship based on the path of the ship to be tracked held up to this point (S24).

At step S23, the particles are generated based on the confirmed position information of the ship. Therefore, the particles generated at step S23 are distributed within a range smaller than the range in which the particles generated at step S24 where the position information is not available are distributed. Since the position information of the ship is not available at step S24, the possible area where the ship may be located is wider than the area obtained when the position information of the ship is available at step S23. In other words, the accuracy in tracking the ship by use of the particles generated at step S23 is higher than the accuracy in tracking the ship by use of the particles generated at step S24. To rephrase, if a ship to be tracked disappears from a captured image, the area in which particles are dispersed can be narrowed by use of position information included in AIS information or radar information related to the ship to be tracked.

As described above, the monitoring device 20 according to the second example embodiment can display the path of a ship more accurately by combining information on the position of the ship obtained from an AIS or a radar with position information of the ship estimated based on a captured image.

Furthermore, the monitoring device 20 can generate correction information for correcting the position of a ship estimated based on an image, by use of AIS information or radar information acquired at substantially the same timing as the timing when the image has been captured. Specifically, the monitoring device 20 adopts the difference between the position of a ship estimated based on an image and the position included in AIS information or radar information as an offset value. The monitoring device 20 corrects the position of a ship estimated based on an image by use of an offset value. With this configuration, the monitoring device 20 can improve the accuracy of an estimated position used as the position of an object to be tracked held at a timing when position information of the object to be tracked cannot be acquired based on AIS information or radar information.

Figure 7:
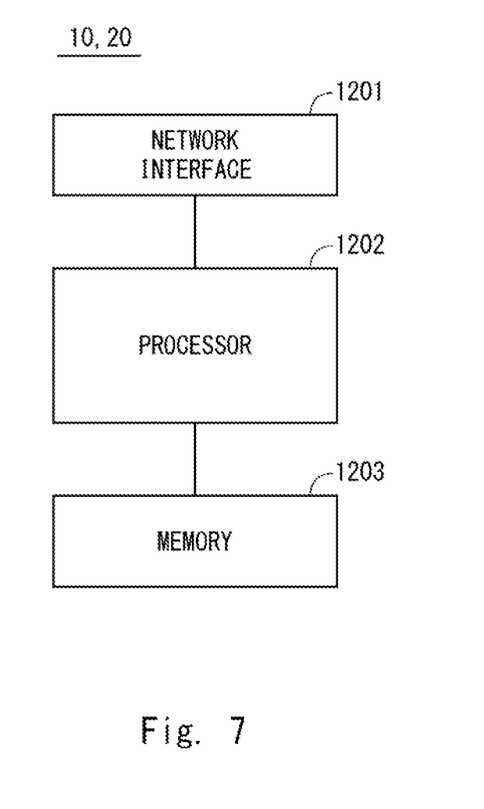
FIG. 7 is a configuration diagram of a monitoring device according to each of the example embodiments.

FIG. 7 is a block diagram illustrating a configuration example of the monitoring device 10 or 20 (hereinafter, referred to as the monitoring device 10 or the like). With reference to FIG. 7, the monitoring device 10 or the like includes a network interface 1201, a processor 1202, and a memory 1203. The network interface 1201 is used to communicate with another network node device constituting a communication system. The network interface 1201 may be used to carry out wireless communication. For example, the network interface 1201 may be used to carry out wireless LAN communication defined in IEEE 802.11 series or mobile communication defined in the 3rd Generation Partnership Project (3GPP). Alternatively, the network interface 1201 may include a network interface card (NIC) compliant with IEEE 802.3 series, for example.

The processor 1202 reads out software (computer program) from the memory 1203 and executes the software. Thus, the processor 1202 implements the processes of the monitoring device 10 or the like described with reference to the flowcharts or sequences according to the foregoing example embodiments. The processor 1202 may be a microprocessor, a microprocessing unit (MPU), or a central processing unit (CPU), for example. The processor 1202 may include a plurality of processors.

The memory 1203 is constituted by a combination of a volatile memory and a non-volatile memory. The memory 1203 may include a storage provided apart from the processor 1202. In this case, the processor 1202 may access the memory 1203 via an I/O interface (not illustrated).

In the example illustrated in FIG. 7, the memory 1203 is used to store a set of software modules. The processor 1202 can read out the set of software modules from the memory 1203 and execute the set of software modules. Thus, the processor 1202 can carry out the processes of the monitoring device 10 or the like described according to the foregoing example embodiments.

As described with reference to FIG. 7, each of the processors included in the monitoring device 10 or the like executes one or more programs including a set of instructions for causing a computer to execute the algorithms described with reference to the drawings.

In the foregoing examples, the program or programs can be stored by use of various types of non-transitory computer readable media and provided to the computer. The non-transitory computer-readable media include various types of tangible storage media. Examples of the non-transitory computer-readable media include a magnetic recording medium, a magneto-optical recording medium (e.g., a magneto-optical disk), a CD-ROM (read-only memory), a CD-R, a CD-R/W, and a semiconductor memory. The magnetic recording medium may be a flexible disk, a magnetic tape, or a hard-disk drive, for example. The semiconductor memory may be a mask ROM, a programmable ROM (PROM), an erasable PROM (EPROM), a flash ROM, or a random-access memory (RAM), for example. The program or programs may also be supplied to the computer in the form of various types of transitory computer-readable media. Examples of the transitory computer-readable media include an electric signal, an optical signal, and an electromagnetic wave. The transitory computer-readable media can supply the program or programs to the computer via a wired communication line, such as an electric wire or an optical fiber, or via a wireless communication line.

It is to be noted that the present disclosure is not limited to the foregoing example embodiments, and modifications can be made as appropriate within the scope that does not depart from the technical spirit of the present disclosure. Moreover, the present disclosure may be implemented by combining the example embodiments, as appropriate.

A part or the whole of the foregoing example embodiments can also be expressed as in the following supplementary notes, but the following are not limiting.

(Supplementary Note 1)
A monitoring device comprising:
 a position information acquiring unit configured to acquire position information of an object to be tracked;
 an estimating unit configured to estimate a position of the object to be tracked displayed in an image captured of a predetermined region; and
 an information generating unit configured to generate path information of the object to be tracked by supplementing, based on an estimated position of the object to be tracked, the position of the object to be tracked held between the position indicated by the position information acquired at a first timing and the position indicated by the position information acquired at a second timing later than the first timing.

(Supplementary Note 2)
The monitoring device according to Supplementary note 1, wherein the position information acquiring unit is configured to acquire the position information of the object to be tracked included in AIS information received from the object to be tracked provided with an AIS.

(Supplementary Note 3)
The monitoring device according to Supplementary note 1 or 2, wherein the position information acquiring unit is configured to acquire the position information of the object to be tracked periodically by use of a radar.

(Supplementary Note 4)
The monitoring device according to any one of Supplementary notes 1 to 3, wherein the information generating unit is configured to correct the estimated position of the object to be tracked by use of a difference between the position of the object to be tracked indicated by the position information and the position of the object to be tracked estimated at a timing when the position information has been acquired.

(Supplementary Note 5)
The monitoring device according to any one of Supplementary notes 1 to 4, wherein the estimating unit is configured to estimate the position of the object to be tracked by use of a particle filter.

(Supplementary Note 6)
The monitoring device according to Supplementary note 5, wherein the estimating unit is configured to limit a region in which the position of the object to be tracked is estimated to fall by use of the position information of the object to be tracked if the object to be tracked fails to be displayed in the image for a predetermined period.

(Supplementary Note 7)
The monitoring device according to any one of Supplementary notes 1 to 6, wherein the estimating unit is configured to estimate the position of the object to be tracked by converting image coordinates of the object to be tracked to world coordinates.

(Supplementary Note 8)
The monitoring device according to any one of Supplementary notes 1 to 7, wherein the information generating unit is configured to cause the path information to be displayed in the image.

(Supplementary Note 9)
The monitoring device according to Supplementary note 2, wherein the information generating unit is configured to cause the path information to be displayed on an AIS screen generated based on the AIS information.

(Supplementary Note 10)
The monitoring device according to Supplementary note 3, wherein the information generating unit is configured to cause the path information to be displayed on a radar screen generated based on information acquired by use of the radar.

(Supplementary Note 11)
A tracking method to be executed in a monitoring device, the tracking method comprising:
 acquiring position information of an object to be tracked;
 estimating a position of the object to be tracked displayed in an image captured of a predetermined region; and
 generating path information of the object to be tracked by supplementing, based on an estimated position of the object to be tracked, the position of the object to be tracked held between the position indicated by the position information acquired at a first timing and the position indicated by the position information acquired at a second timing later than the first timing.

(Supplementary Note 12)
A non-transitory computer-readable medium storing a program that causes a computer to execute:
 acquiring position information of an object to be tracked;
 estimating a position of the object to be tracked displayed in an image captured of a predetermined region; and
 generating path information of the object to be tracked by supplementing, based on an estimated position of the object to be tracked, the position of the object to be tracked held between the position indicated by the position information acquired at a first timing and the position indicated by the position information acquired at a second timing later than the first timing.

REFERENCE SIGNS LIST 10 monitoring device
11 position information acquiring unit
12 estimating unit
13 information generating unit
20 monitoring device
21 radar information acquiring unit
22 AIS information acquiring unit
23 imaging unit
24 estimating unit
25 information generating unit

The invention claimed is:
1. A tracking method to be executed in a server being controllable a display, the tracking method comprising:
 acquiring first position information related to a target by a first method, the first position information related to a position of the target at a first time;
 acquiring second position information related to the target by a second method, the second method being different from the first method and using an image captured by a camera at the second time after the first time, and the second position information related to a position of the target at a second time; and displaying on the display, first information that indicates the first position information, second information that indicates the second position information, third information that indicates the first method, fourth information that indicates the second method, and a moving path of the target on the display based on the first position information and the second position information, wherein the first information and the third information are displayed in association with each other, the second information and the fourth information are displayed in association with each other, the first information indicates that the first position information is first icon which is displayed on a map, and the second information indicates that the second position information is second icon which is displayed on the map.

2. The tracking method according to claim 1, wherein the target is person.

3. The tracking method according to claim 1, wherein the first method uses a radio waves emitted by an apparatus.

4. The tracking method according to claim 1, wherein the moving path connects first icon which is displayed on a map with second icon which is displayed on the map.

5. The tracking method according to claim 1, further comprising:
displaying a map on the display; wherein
the moving path is displayed on the map.

6. The tracking method according to claim 1, further comprising:
acquiring first time information related to the first position information; and
acquiring second position information related to the second time; wherein
the moving path includes a moving direction, the moving direction determined by the first time information and the second time information.

7. The tracking method according to claim 1, further comprising:
estimating whether the target included in images captured at different timings are the same target.

8. The tracking method according to claim 1, further comprising:
displaying a name of the target together with the first position information and the second position information.

9. The tracking method according to claim 1, further comprising:
acquiring third position information related to the target by the first method, the third position information related to a position of the target at a third time; wherein
the second time is a time between the first time and the third time,
the moving path is a path between the first position information and the third position information, and
the moving path is supplemented based on the second position information.

10. A non-transitory computer-readable medium storing a program that causes a computer to execute:
acquiring first position information related to a target by a first method, the first position information related to a position of the target at a first time;
acquiring second position information related to the target by a second method, the second method being different from the first method and using an image captured by a camera at the second time after the first time, and the second position information related to a position of the target at a second time; and displaying, on the display, first information that indicates the first position information, second information that indicates the second position information, third information that indicates the first method, fourth information that indicates the second method, and a moving path of the target on the display based on the first position information and the second position information, wherein the first information and the third information are displayed in association with each other, the second information and the fourth information are displayed in association with each other, the first information indicates that the first position information is first icon which is displayed on a map, and the second information indicates that the second position information is second icon which is displayed on the map.

11. The non-transitory computer-readable medium according to claim 10, wherein the target is person.

12. The non-transitory computer-readable medium according to claim 10, wherein the first method uses a radio waves emitted by an apparatus.

13. The non-transitory computer-readable medium according to claim 10, wherein
the moving path connects first icon which is displayed on a map with second icon which is displayed on the map.

14. The non-transitory computer-readable medium according to claim 10, further comprising:
displaying a map on the display; wherein
the moving path is displayed on the map.

15. The non-transitory computer-readable medium according to claim 10, further comprising:
acquiring first time information related to the first position information; and
acquiring second position information related to the second time; wherein
the moving path includes a moving direction, the moving direction determined by the first time information and the second time information.

16. A tracking system comprising:
at least one memory storing instructions, and
at least one processor configured to execute the instructions to;
acquire first position information related to a target by a first method, the first position information related to a position of the target at a first time;
acquire second position information related to the target by a second method, the second method being different from the first method and using an image captured by a camera at the second time after the first time, and the second position information related to a position of the target at a second time; and
display on the display, first information that indicates the first position information, second information that indicates the second position information, third information that indicates the first method, fourth information that indicates the second method, and a moving path of the target on the display based on the first position information and the second position information, wherein the first information and the third information are displayed in association with each other, the second information and the fourth information are displayed in association with each other, the first information indicates that the first position information is first icon which is displayed on a map, and the second information indicates that the second position information is second icon which is displayed on the map.

17. The tracking system according to claim 16,
wherein the first method uses a radio waves emitted by an apparatus.

18. The tracking system according to claim 16, wherein the the moving path connects first icon which is displayed on a map with second icon which is displayed on the map.

19. The tracking system according to claim 16, wherein the at least one processor is further configured to execute the instructions to display a map on a display, and the moving path is displayed on the map.

20. The tracking system according to claim 16, wherein the at least one processor is further configured to execute the instructions to acquire first time information related to the first position information and acquire second position information related to the second time, and the moving path includes a moving direction, the moving direction determined by the first time information and the second time information.

\* \* \* \* \*